(12) United States Patent
Lei (10) Patent No.: US 10,200,988 B2
(45) Date of Patent: Feb. 5, 2019

(54) PHYSICAL RESOURCE BLOCK SCHEDULING METHOD, DEVICE, AND SYSTEM

(71) Applicant: Huawei Technologies Co., Ltd., Shenzhen (CN)

(72) Inventor: Lingyun Lei, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 49 days.

(21) Appl. No.: 15/630,509

(22) Filed: Jun. 22, 2017

(65) Prior Publication Data

US 2017/0289983 A1 Oct. 5, 2017

Related U.S. Application Data

(63) Continuation of application No. PCT/CN2014/094661, filed on Dec. 23, 2014.

(51) Int. Cl.
*H04W 4/00* (2018.01)
*H04W 72/04* (2009.01)
*H04W 72/12* (2009.01)
*H04L 5/00* (2006.01)
*H04W 74/00* (2009.01)

(52) U.S. Cl.
CPC ......... *H04W 72/044* (2013.01); *H04L 5/0053* (2013.01); *H04L 5/0064* (2013.01); *H04L 5/0087* (2013.01); *H04W 72/042* (2013.01); *H04W 72/1284* (2013.01); *H04L 5/0044* (2013.01); *H04W 74/002* (2013.01)

(58) Field of Classification Search
None
See application file for complete search history.

(56) References Cited

U.S. PATENT DOCUMENTS

| | | | |
|---|---|---|---|
| 9,844,029 B2 * | 12/2017 | Suzuki | H04L 1/1861 |
| 2007/0177553 A1 * | 8/2007 | Frederiksen | H04L 1/0025 370/335 |
| 2011/0256884 A1 | 10/2011 | Kazmi et al. | |
| 2011/0299484 A1 * | 12/2011 | Nam | H04L 1/0025 370/329 |
| 2012/0069805 A1 | 3/2012 | Feuersanger et al. | |
| 2013/0188566 A1 * | 7/2013 | Zhu | H04W 72/042 370/329 |

(Continued)

FOREIGN PATENT DOCUMENTS

| | | |
|---|---|---|
| CN | 101431774 A | 5/2009 |
| CN | 102045861 A | 5/2011 |

(Continued)

*Primary Examiner* — Bob A Phunkulh
(74) *Attorney, Agent, or Firm* — Slater Matsil, LLP (57) ABSTRACT

Embodiments include a physical resource block scheduling method, network device, and system, which may be used to perform scheduling request indicator SRI scheduling. The method includes: receiving a scheduling request indicator SRI sent by user equipment UE; allocating M PRBs to the UE according to a reference quantity of bits for scheduling; receiving, on a physical uplink shared channel, an uplink transmission block TB that is sent, in response to current-time SRI scheduling, by the UE; and determining, according to the uplink TB, a reference quantity of bits for scheduling for next-time SRI scheduling of the UE.

17 Claims, 3 Drawing Sheets

(56) References Cited

U.S. PATENT DOCUMENTS

| | | | | |
|---|---|---|---|---|
| 2013/0250886 A1* | 9/2013 | Zhou | .................... | H04L 1/0026 370/329 |
| 2013/0258960 A1* | 10/2013 | Chen | ................ | H04W 72/0406 370/329 |
| 2013/0258978 A1* | 10/2013 | Aiba | .................. | H03M 13/136 370/329 |
| 2015/0131546 A1* | 5/2015 | Seo | .................. | H04W 72/0453 370/329 |
| 2015/0373704 A1* | 12/2015 | Hooli | ..................... | H04L 47/36 370/329 |
| 2016/0081105 A1* | 3/2016 | Mizusawa | .............. | H04J 11/005 370/281 |
| 2017/0141903 A1* | 5/2017 | Xu | ........................ | H04L 1/0005 |
| 2017/0202000 A1* | 7/2017 | Fu | ..................... | H04W 28/0236 |

FOREIGN PATENT DOCUMENTS

| | | |
|---|---|---|
| CN | 102685895 A | 9/2012 |
| EP | 2661138 A1 | 11/2013 |
| EP | 2675081 A1 | 12/2013 |
| WO | 2014035301 A1 | 3/2014 |
| WO | 2015122701 A1 | 8/2015 |

* cited by examiner

PHYSICAL RESOURCE BLOCK SCHEDULING METHOD, DEVICE, AND SYSTEM

CROSS-REFERENCE TO RELATED APPLICATIONS

This application is a continuation of International Application No. PCT/CN2014/094661, filed on Dec. 23, 2014, the disclosure of which is hereby incorporated by reference in its entirety.

TECHNICAL FIELD

Embodiments of the present invention relate to the communications field, and in particular, to a physical resource block scheduling method, device, and system.

BACKGROUND

In an existing mobile communications system, user equipment (UE) generally has relatively frequent uplink small data packet services such as sending of a ping, uplink response signaling to downlink signaling, an acknowledgment packet for transmission of downlink data, and an SMS message.

A Long Term Evolution (LTE) system is used as an example. After UE establishes a radio resource control (RRC) connection in a cell, if uplink data needs to be transmitted, the UE first needs to send a scheduling request indicator (SRI) to an evolved Node B (eNodeB), and the eNodeB responds to the SRI, and allocates a quantity of physical resource blocks (PRB) to the UE. This process may be referred to as SRI scheduling for short, and an SRI sending period generally lasts 5 milliseconds to 80 milliseconds.

The UE transfers a buffer status report (BSR) to the eNodeB for the first time by using the PRBs allocated by the eNodeB. The eNodeB obtains, according to the BSR, a data size of uplink data that the UE waits to transmit, and allocates a proper quantity of PRB resources to the UE. This process may be referred to as BSR scheduling for short.

Subsequently, the UE sends a BSR to the eNodeB in a periodic manner or an event triggering manner. The eNodeB schedules a PRB according to the received BSR, so that uplink data is continuously transmitted. When a BSR sent by the UE indicates that a data size of uplink data that the UE waits to transmit is 0, the eNodeB stops scheduling a PRB resource for the UE. A BSR period generally lasts 5 milliseconds to 2560 milliseconds.

In the prior art, PRBs of a cell cannot be properly allocated during SRI scheduling, resulting in that utilization of PRB resources of the cell may be reduced.

SUMMARY

In view of this, embodiments of the present invention provide a PRB scheduling method, device, and system, so as to improve utilization of PRB resources of a cell.

According to a first aspect, an embodiment of the present invention provides a physical resource block (PRB) scheduling method, where the method is used for a network device to perform scheduling request indicator SRI scheduling. The method includes receiving, by the network device, a scheduling request indicator SRI sent by user equipment UE, where the SRI is used for the UE to request transmission of to-be-transmitted uplink data. The method also includes allocating, by the network device, M PRBs to the UE according to a reference quantity of bits for scheduling, where M is an integer greater than or equal to zero, the reference quantity of bits for scheduling is set by the network device, and the reference quantity of bits for scheduling is less than or equal to a total quantity of bits that can be transmitted by using the M PRBs. The method also includes receiving, by the network device, on a physical uplink shared channel PUSCH, an uplink transmission block TB that is sent, in response to SRI scheduling, by the UE by using at least one PRB of the M PRBs. The method also includes determining, by the network device according to the uplink TB, a reference quantity of bits for scheduling for next-time SRI scheduling of the UE.

In a first possible implementation manner of the first aspect, the determining, by the network device according to the uplink TB, a reference quantity of bits for scheduling for next-time SRI scheduling of the UE includes: if the uplink TB does not include a BSR, or the uplink TB includes a BSR and a buffer size BS level in the BSR equals 0, obtaining, by the network device, a quantity of bits which are not used for padding in the uplink TB; and if the quantity of bits which are not used for padding in the uplink TB is greater than a lowering protection threshold, determining, by the network device, that the reference quantity of bits for scheduling for next-time SRI scheduling of the UE is a larger value of the following two: the quantity of bits which are not used for padding in the uplink TB and a lower limit of the reference quantity of bits for scheduling, which is an integer greater than or equal to zero.

With reference to the first possible implementation manner of the first aspect, in a second possible implementation manner, the method further includes: adjusting, by the network device, the lowering protection threshold according to a quantity of padding bits in the uplink TB.

With reference to the second possible implementation manner of the first aspect, in a third possible implementation manner, the adjusting, by the network device, the lowering protection threshold according to a quantity of padding bits in the uplink TB includes: when it is determined that a ratio of the quantity of padding bits in the uplink TB to a total quantity of bits in the uplink TB is greater than a ratio threshold, adding, by the network device, 1 to a lowering count within a counting period; and if the lowering count within the counting period exceeds a count threshold, lowering, by the network device, the lowering protection threshold.

In a fourth possible implementation manner of the first aspect, the determining, by the network device according to the uplink TB, a reference quantity of bits for scheduling for next-time SRI scheduling of the UE includes: if the uplink TB includes a buffer status report BSR, and a buffer size BS level in the BSR is greater than 0, determining, by the network device, that the reference quantity of bits for scheduling for next-time SRI scheduling is a smaller value of the following two: an upper limit of the reference quantity of bits for scheduling and a sum of the reference quantity of bits for scheduling and an upper limit of a bit quantity range corresponding to the BS level.

With reference to the first aspect or any one of the first to the fourth possible implementation manners of the first aspect, in a fifth possible implementation manner, an initial value of the reference quantity of bits for scheduling is the lower limit of the reference quantity of bits for scheduling.

With reference to the first aspect or any one of the first to the fifth possible implementation manners of the first aspect, in a sixth possible implementation manner, the UE is UE of a Voice over Internet Protocol VoIP type.

With reference to the first aspect or any one of the first to the sixth possible implementation manners of the first aspect, in a seventh possible implementation manner, the network device is an evolved Node B eNodeB.

According to a second aspect, an embodiment of the present invention provides a network device. The network device includes a receiving unit, configured to receive a scheduling request indicator SRI sent by user equipment UE, where the SRI is used for the UE to send a request to the network device, to request transmission of to-be-transmitted uplink data. The network device also includes an allocation unit, configured to allocate M PRBs to the UE according to a reference quantity of bits for scheduling, where the M PRBs are used to transmit the to-be-transmitted uplink data of the UE, M is an integer greater than or equal to zero, the reference quantity of bits for scheduling is set by a determining unit, and the reference quantity of bits for scheduling is less than or equal to a total quantity of bits that can be transmitted by using the M PRBs. The receiving unit is further configured to receive, on a physical uplink shared channel PUSCH by using at least one PRB of the M PRBs, an uplink transmission block TB that is sent, in response to SRI scheduling, by the UE. The network device also includes the determining unit, configured to determine, according to the uplink TB received by the receiving unit, a reference quantity of bits for scheduling for next-time SRI scheduling of the UE.

In a first possible implementation manner of the second aspect, the determining unit being configured to determine, according to the uplink TB received by the receiving unit, a reference quantity of bits for scheduling for next-time SRI scheduling of the UE includes: if the uplink TB does not include a BSR, or the uplink TB includes a BSR and a buffer size BS level in the BSR equals 0, obtaining a quantity of bits which are not used for padding in the uplink TB received by the receiving unit; and if the quantity of bits which are not used for padding in the uplink TB is greater than a lowering protection threshold, determining that the reference quantity of bits for scheduling for next-time SRI scheduling of the UE is a larger value of the following two: the quantity of bits which are not used for padding in the uplink TB and a lower limit of the reference quantity of bits for scheduling, which is an integer greater than or equal to zero.

With reference to the first possible implementation manner of the second aspect, in a second possible implementation manner, the network device further includes: an adjustment unit, configured to adjust the lowering protection threshold according to a quantity of padding bits in the uplink TB.

With reference to the second possible implementation manner of the second aspect, in a third possible implementation manner, the adjustment unit being configured to adjust the lowering protection threshold according to a quantity of padding bits in the uplink TB includes: when it is determined that a ratio of the quantity of padding bits in the uplink TB to a total quantity of bits in the uplink TB is greater than a ratio threshold, adding 1 to a lowering count within a counting period; and if the lowering count within the counting period exceeds a count threshold, lowering the lowering protection threshold.

In a fourth possible implementation manner of the second aspect, the determining unit being configured to determine, according to the uplink TB received by the receiving unit, a reference quantity of bits for scheduling for next-time SRI scheduling of the UE includes: if the uplink TB includes a buffer status report BSR, and a buffer size BS level in the BSR is greater than 0, determining that the reference quantity of bits for scheduling for next-time SRI scheduling is a smaller value of the following two: an upper limit of the reference quantity of bits for scheduling and a sum of the reference quantity of bits for scheduling and an upper limit of a bit quantity range corresponding to the BS level.

With reference to the second aspect or any one of the first to the fourth possible implementation manners of the second aspect, in a fifth possible implementation manner, the determining unit sets an initial value of the reference quantity of bits for scheduling as the lower limit of the reference quantity of bits for scheduling.

With reference to the second aspect or any one of the first to the fifth possible implementation manners of the second aspect, in a sixth possible implementation manner, the UE is UE of a Voice over Internet Protocol VoIP type.

With reference to the second aspect or any one of the first to the sixth possible implementation manners of the second aspect, in a seventh possible implementation manner, the network device is an evolved Node B eNodeB.

According to a third aspect, an embodiment of the present invention provides a physical resource block PRB scheduling system, where the system includes: at least one user equipment UE and the foregoing network device.

According to the method, device, and system in the embodiments of the present invention, a reference quantity of bits for scheduling for next-time SRI scheduling of UE is determined according to an uplink transmission block that is sent, in response to current-time SRI scheduling, by the UE on an allocated initial PRB resource. For an uplink small data packet service whose corresponding periodic packet length does not change greatly, a proper PRB resource may be allocated for next-time SRI scheduling, so that it can be ensured that data packets to be transmitted of the UE are all sent at one time, and PRB resources of a cell are not wasted.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Methods and apparatuses in the embodiments of the present invention may be implemented by using a network device. In the implementation, the network device includes, but is not limited to, any one or more than one of the following, for example, an eNodeB or a control node of another access network device. For ease of description, an eNodeB in an LTE system is used as an example in the embodiments of the present invention. It can be understood that the present invention is not limited thereto. In the embodiments of the present invention, for a network device, a user and user equipment have a same meaning.

Figure 1:
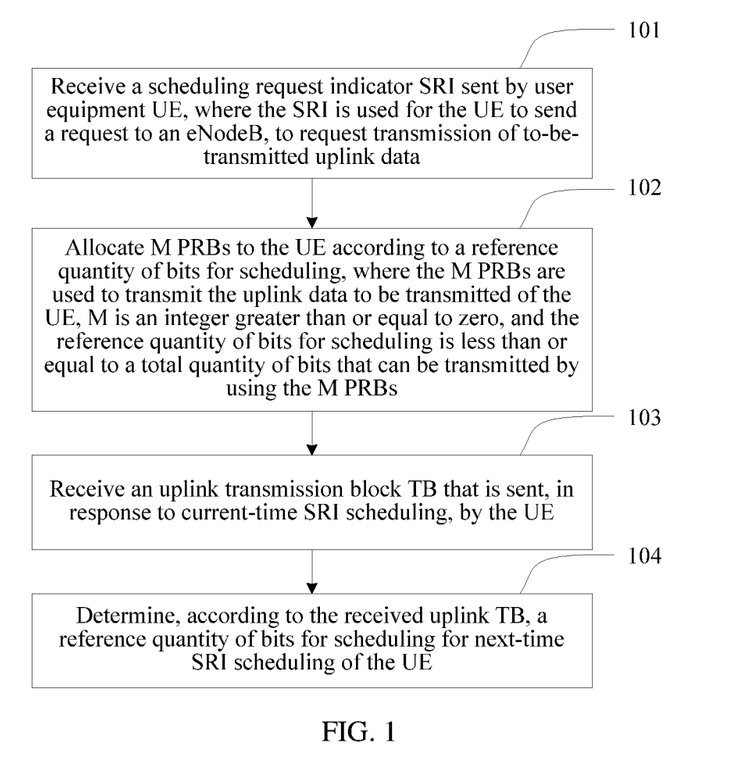
FIG. 1 is a flowchart of a PRB scheduling method according to an embodiment of the present invention.

FIG. 1 is a flowchart of a PRB scheduling method according to an embodiment of the present invention. The method may be used for a network device such as an eNodeB. The method may include the following steps.

Step 101: An eNodeB receives a scheduling request indicator SRI sent by user equipment UE, where the SRI is used for the UE to send a request to the eNodeB, to request transmission of to-be-transmitted uplink data.

When the UE is in an RRC connected state, if there is to-be-transmitted uplink data, the UE sends a request to the eNodeB by using an SRI, to request an uplink resource to transmit the to-be-transmitted uplink data. The eNodeB receives, on a physical uplink control channel (PUCCH), the SRI sent by the UE. It should be noted that the method in this embodiment of the present invention may be adopted according to a type of the UE. For example, the UE may be UE that performs a Voice over Internet Protocol (VoIP) service, and in this case, the UE is referred to as UE of a VoIP type. Alternatively, the UE may be UE that performs a ping packet service, and in this case, the UE is referred to as UE of a PING type. These types of UEs generally send uplink small data packets periodically, and a packet length does not change greatly in different periods.

Step 102: The eNodeB allocates M PRBs to the UE according to a reference quantity of bits for scheduling, where the M PRBs are used to transmit the to-be-transmitted uplink data of the UE, M is an integer greater than or equal to zero, and the reference quantity of bits for scheduling is less than or equal to a total quantity of bits that can be transmitted by using the M PRBs.

The eNodeB cannot obtain, by using the SRI, an amount of to-be-transmitted uplink data that needs to be sent. In an embodiment of the present invention, the eNodeB receives the SRI for SRI scheduling, and may allocate, according to a reference quantity of bits for scheduling, M PRBs to the UE as an initial uplink resource to transmit the to-be-transmitted uplink data of the UE, where M is an integer greater than or equal to zero, and the reference quantity of bits for scheduling is less than or equal to a total quantity of bits that can be transmitted by using the M PRBs.

The reference quantity of bits for scheduling is set by the eNodeB. When performing first-time SRI scheduling for the UE, the eNodeB may set an initial value for the reference quantity of bits for scheduling, where the initial value is, for example, a lower limit of the reference quantity of bits for scheduling or a size of a BSR. It should be noted that only examples are provided in the foregoing, but the present invention is not limited thereto.

Step 103: The eNodeB receives an uplink transmission block TB that is sent, in response to current-time SRI scheduling, by the UE by using at least one PRB of the M PRBs allocated in step 102.

The eNodeB receives, on a physical uplink shared channel (PUSCH), the uplink TB that is sent, in response to current-time SRI scheduling, by the UE by using the at least one PRB of the M PRBs allocated in step 102. It should be noted that because the to-be-transmitted uplink data of the UE cannot be accurately known, although the eNodeB allocates the M PRBs to the UE as the uplink scheduling resource to send the to-be-transmitted uplink data, the UE may perform data transmission by using the at least one PRB of the M PRBs according to a size of the to-be-transmitted uplink data. For example, when an amount of the to-be-transmitted uplink data is relatively small, the UE sends, in response to current-time SRI scheduling, the uplink TB by using one of the M PRBs. These are all examples, but this embodiment of the present invention is not limited thereto.

Step 104: The eNodeB determines, according to the uplink TB received in step 103, a reference quantity of bits for scheduling for next-time SRI scheduling of the UE.

The reference quantity of bits for scheduling for next-time SRI scheduling of the UE is less than or equal to an upper limit of the reference quantity of bits for scheduling. Besides, the reference quantity of bits for scheduling for next-time SRI scheduling of the UE is greater than or equal to a lower limit of the reference quantity of bits for scheduling. The upper limit of the reference quantity of bits for scheduling is used to prevent most PRBs from being occupied by SRI scheduling of UE, so as to maintain fairness for other users. The lower limit of the reference quantity of bits for scheduling is used to prevent the reference quantity of bits for scheduling from being adjusted to be excessively low.

In a process of transmitting uplink data, the UE may indicate, to the eNodeB by using a BSR, a size of data that needs to be sent in an uplink buffer of the UE, so that the eNodeB determines to allocate an uplink resource to the UE during BSR scheduling. An uplink buffer size (BS) of the UE may be indicated by using a BSR index in the BSR. Each BSR index corresponds to a BS level. One BS level corresponds to one bit quantity range. When the BS level is 0, it indicates that a quantity of bits of data to be transmitted in the uplink buffer is 0. For example, when the BS level is 1, it indicates that $0<BS \leq 10$, that is, the quantity of bits of data to be transmitted in the uplink buffer is between 0 and 10 bits. For another example, when the BS level is 26, it indicates that $440<BS \leq 515$, that is, the quantity of bits of data to be transmitted in the uplink buffer is between 440 and 515 bits, and may be, for example, 500 bits. It should be noted that only examples are provided in the foregoing, but the present invention is not limited thereto.

In an embodiment of the present invention, if the uplink TB received in step 103 includes a BSR and a BS level in the BSR is greater than 0, the eNodeB determines that the reference quantity of bits for scheduling for next-time SRI scheduling of the UE is a smaller value of the following two: the upper limit of the reference quantity of bits for scheduling and a sum of the reference quantity of bits for scheduling for current-time SRI scheduling and an upper limit of a bit quantity range corresponding to the BS level.

For example, the reference quantity of bits for scheduling for current-time SRI scheduling is 300, the upper limit of the reference quantity of bits for scheduling is 2048 bits, and the eNodeB obtains the BSR from the uplink TB obtained in step 103, where the BS level in the BSR is 26, the upper limit of the bit quantity range corresponding to the BS level being 26 is 515 bits, and the upper limit of the reference quantity of bits for scheduling is 2048 bits. In this case, the eNodeB determines that the reference quantity of bits for scheduling for next-time SRI scheduling of the UE is a smaller value of 2048 and a sum of 300 and 515, that is, is 815 bits.

Therefore, the eNodeB may allocate an initial uplink resource to the UE according to 815 bits during next-time SRI scheduling.

For another example, the reference quantity of bits for scheduling is 800 bits, the upper limit of the reference quantity of bits for scheduling is 2048 bits, and the eNodeB obtains the BSR from the uplink TB obtained in step 103, where the BS level in the BSR is 32, the upper limit of the bit quantity range corresponding to the BS level being 32 is 1326, and the upper limit of the reference quantity of bits for scheduling is 2048 bits. In this case, the eNodeB determines that the reference quantity of bits for scheduling for next-time SRI scheduling of the UE is a smaller value of 2048 and a sum of 800 and 1326, that is, is 2048 bits.

For another example, the upper limit of the reference quantity of bits for scheduling is 2048 bits. The reference quantity of bits for scheduling already reaches the upper limit of the reference quantity of bits for scheduling, that is, reaches 2048 bits. In this case, even if the BS level in the BSR in the uplink TB is greater than 0, the eNodeB determines that the reference quantity of bits for scheduling for next-time SRI scheduling of the UE is still 2048 bits.

It should be noted that only examples for convenience are provided in the foregoing, but the present invention is not limited thereto.

In another embodiment of the present invention, if the uplink TB received in step 103 does not include a BSR or a BS level in a BSR is 0, the eNodeB obtains a quantity of bits which are not used for padding in the uplink TB. The eNodeB determines that the reference quantity of bits for scheduling for next-time SRI scheduling of the UE is a larger value of the following two: the quantity of bits which are not used for padding in the uplink TB and the lower limit of the reference quantity of bits for scheduling.

To avoid that the reference quantity of bits for scheduling for next-time SRI scheduling is adjusted to be relatively small because an amount of the to-be-transmitted uplink data of which transmission is requested in the SRI scheduling of the UE is relatively small, protection may be performed by using a lowering protection threshold when the reference quantity of bits for scheduling decreases. In another embodiment of the present invention, if the uplink TB received in step 103 does not include a BSR or a BS level in a BSR is 0, the eNodeB obtains a quantity of bits which are not used for padding in the uplink TB. If the quantity of bits which are not used for padding in the uplink TB is greater than the lowering protection threshold, the eNodeB determines that the reference quantity of bits for scheduling for next-time SRI scheduling of the UE is a larger value of the following two: the quantity of bits which are not used for padding in the uplink TB and the lower limit of the reference quantity of bits for scheduling. For example, the reference quantity of bits for scheduling is 1024 bits, the lowering protection threshold is 600 bits, the lower limit of the reference quantity of bits for scheduling is 400 bits, the BS level in the BSR in the uplink TB is 0, the quantity of bits which are not used for padding obtained by the eNodeB in the uplink TB is 800 bits, and 800 bits is greater than 600 bits. In this case, the eNodeB determines that the reference quantity of bits for scheduling for next-time SRI scheduling of the UE is a larger value of 800 and 400, that is, is 800 bits. It should be noted that only examples for convenience are provided in the foregoing, but the present invention is not limited thereto.

Same UE in an RRC connected state may transmit uplink data multiple times, that is, the UE may send an SRI to the eNodeB multiple times to request an uplink resource to transmit to-be-transmitted uplink data. Correspondingly, the eNodeB performs SRI scheduling on the same UE multiple times. For a small data packet service, if a size of most of the to-be-transmitted uplink data is below an upper limit of a reference quantity of bits for scheduling and a periodic packet length does not change greatly, by means of the method provided in this embodiment of the present invention, the eNodeB may adaptively adjust the reference quantity of bits for scheduling according to a size of the to-be-transmitted uplink data of current-time SRI scheduling, and use the adjusted reference quantity of bits for scheduling to allocate an initial uplink resource in next-time SRI scheduling.

When the size of the to-be-transmitted uplink data increases, the reference quantity of bits for scheduling on which adjustment is performed in at least one time of SRI scheduling is greater than or equal to a size of to-be-transmitted uplink data during next-time SRI scheduling, so that the eNodeB may allocate a PRB resource according to the reference quantity of bits for scheduling during next-time SRI scheduling, and the allocated PRB resource may be used to transmit at one time the to-be-transmitted uplink data in next-time SRI scheduling. When the size of the to-be-transmitted uplink data decreases, the reference quantity of bits for scheduling decreases accordingly, so that PRB resources are prevented from being wasted.

Further, before performing first-time SRI scheduling on the same UE, the eNodeB may set the reference quantity of bits for scheduling to an initial value, where the initial value is, for example, a quantity of bits needed to send one BSR, or may be the lower limit of the reference quantity of bits for scheduling, but the present invention is not limited thereto.

Further, to adjust the lowering protection threshold in time, a method provided in another embodiment of the present invention may further include the following steps.

Step 105: The eNodeB adjusts a lowering protection threshold according to a quantity of padding bits in the uplink TB received in step 103.

The eNodeB may adjust the lowering protection threshold according to a ratio of the quantity of padding bits in the uplink TB received in step 103 to a total quantity of bits in the uplink TB. The uplink TB includes the to-be-transmitted uplink data and the padding bits. If the ratio of the quantity of padding bits is relatively high, it indicates that an amount of the to-be-transmitted uplink data is relatively small. In an embodiment of the present invention, when determining that the ratio of the quantity of padding bits in the uplink TB received in step 103 to the total quantity of bits in the uplink TB is greater than a ratio threshold, the eNodeB may decrease the lowering protection threshold, and decrease a value of the lowering protection threshold by one step value, for example, one bit.

In another embodiment of the present invention, a quantity of times for which the ratio of the quantity of padding bits in the uplink TB of the UE in response to SRI scheduling to the total quantity of bits in the uplink TB is greater than the ratio threshold within a period of time such as a counting period may be counted. For example, within a counting period, when determining that the ratio of the quantity of padding bits in the uplink TB received in step 103 to the total quantity of bits in the uplink TB is greater than the ratio threshold, the eNodeB adds 1 to a lowering count within the counting period. If the lowering count is greater than a count threshold, the eNodeB decreases the lowering protection threshold. The eNodeB performs at least one time of SRI scheduling within the counting period. By means of the method in this embodiment, that the reference quantity of bits for scheduling for next-time SRI scheduling cannot be lowered in time because the lowering protection threshold is set to be excessively large, resulting in that a relatively large quantity of PRB resources are wasted when next-time SRI scheduling is performed according to the reference quantity of bits for scheduling can be avoided, so that utilization of PRB resources is further improved.

Figure 2:
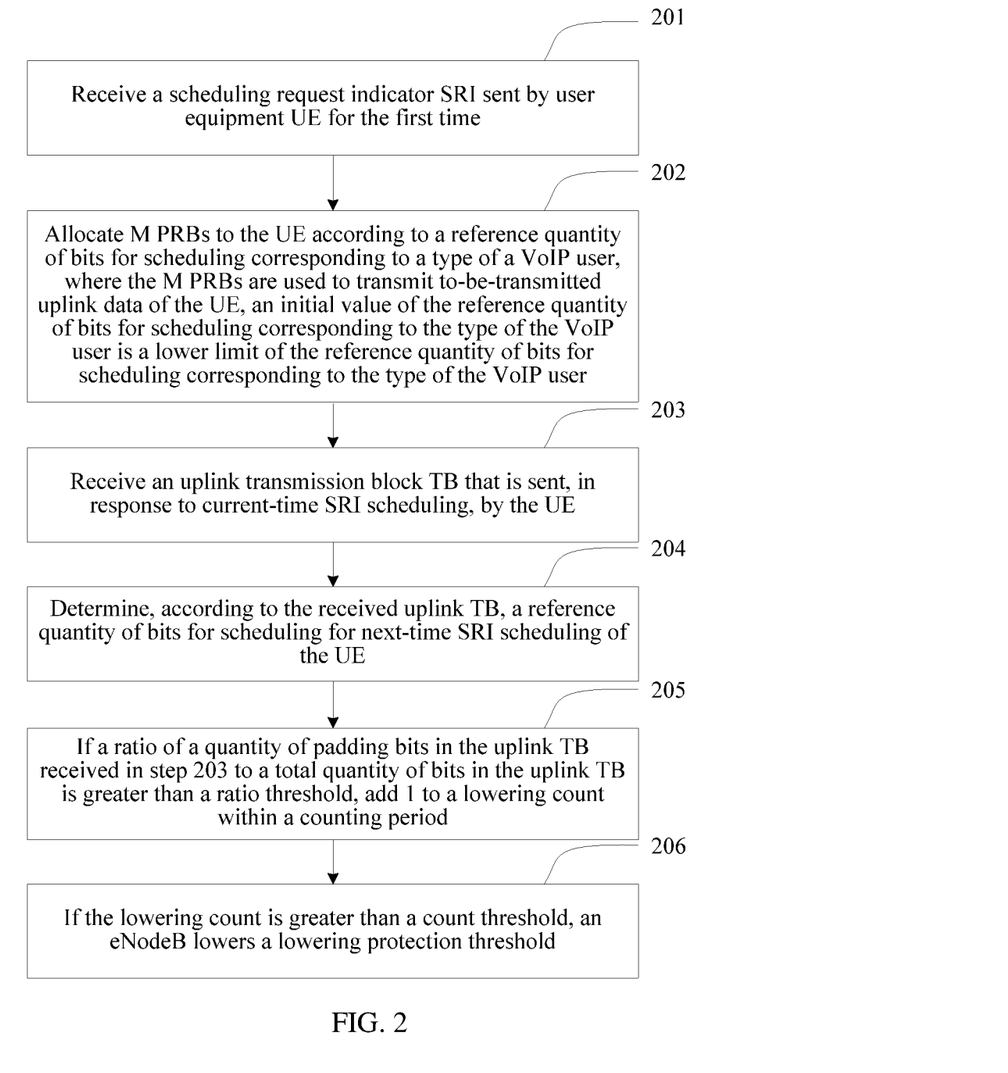
FIG. 2 is a flowchart of a PRB scheduling method according to another embodiment of the present invention.

FIG. 2 is a flowchart of a PRB scheduling method according to another embodiment of the present invention. The method may be used for a network device such as an eNodeB. The method may include the following steps.

Step 201: An eNodeB receives a scheduling request indicator SRI sent by user equipment UE for the first time.

The eNodeB may use the method in this embodiment of the present invention for different types of users such as a VoIP user according to requirements. In this embodiment of the present invention, a VoIP user is used as an example, and it should be noted that this embodiment of the present invention is not limited thereto.

Step 202: The eNodeB allocates M PRBs to the UE according to a reference quantity of bits for scheduling corresponding to a type of a VoIP user, where the M PRBs are used to transmit to-be-transmitted uplink data of the UE, an initial value of the reference quantity of bits for scheduling corresponding to the type of the VoIP user is a lower limit of the reference quantity of bits for scheduling corresponding to the type of the VoIP user, where M is an integer greater than or equal to zero, and the reference quantity of bits for scheduling corresponding to the type of the VoIP user is less than or equal to a total quantity of bits that can be transmitted by using the M PRBs.

It should be noted that a user of each type may use a parameter, for example, a reference quantity of bits for scheduling, an upper limit of the reference quantity of bits for scheduling, and a lower limit of the reference quantity of bits for scheduling, corresponding to the type. It should be noted that parameters mentioned in this embodiment of the present invention all refer to parameters corresponding to the type of the VoIP user if there is no special instructions.

The reference quantity of bits for scheduling is set by the eNodeB. Because the eNodeB performs first-time SRI scheduling for the UE, the eNodeB may set an initial value, such as a lower limit of the reference quantity of bits for scheduling or a size of a BSR, for the reference quantity of bits for scheduling. It should be noted that these are all examples, but the present invention is not limited thereto.

Step 203: The eNodeB receives, on a physical uplink shared channel PUSCH, an uplink transmission block TB that is sent, in response to current-time SRI scheduling, by the UE by using at least one PRB of the M PRBs allocated in step 202.

The eNodeB receives, on the PUSCH, the uplink TB that is sent, in response to current-time SRI scheduling, by the UE by using the at least one PRB of the M PRBs allocated in step 202. It should be noted that the to-be-transmitted uplink data of the UE cannot be accurately known, and therefore, although the eNodeB allocates the M PRBs to the UE as an uplink scheduling resource to send the to-be-transmitted uplink data, the UE may perform data transmission by using the at least one PRB of the M PRBs according to a size of the to-be-transmitted uplink data. For example, when an amount of the to-be-transmitted uplink data is relatively small, the UE sends, in response to current-time SRI scheduling, the uplink TB by using one of the M PRBs. These are all examples, but this embodiment of the present invention is not limited thereto.

Step 204: The eNodeB determines, according to the uplink TB received in step 203, a reference quantity of bits for scheduling for next-time SRI scheduling of the UE.

The reference quantity of bits for scheduling for next-time SRI scheduling of the UE is less than or equal to an upper limit of the reference quantity of bits for scheduling. Besides, the reference quantity of bits for scheduling for next-time SRI scheduling of the UE is greater than or equal to a lower limit of the reference quantity of bits for scheduling.

The uplink TB that is sent, in response to current-time SRI scheduling, by the UE may include a BSR. The BSR indicates a size of data that needs to be sent in an uplink buffer of the UE, so that the eNodeB determines to allocate an uplink resource during BSR scheduling.

If the received uplink TB includes a BSR and a BS level in the BSR is greater than 0, the eNodeB determines that the reference quantity of bits for scheduling for next-time SRI scheduling of the UE is a smaller value of the following two: the upper limit of the reference quantity of bits for scheduling and a sum of the reference quantity of bits for scheduling for current-time SRI scheduling and an upper limit of a bit quantity range corresponding to the BS level.

If the received uplink TB does not include a BSR or a BS level in a BSR is 0, the eNodeB obtains a quantity of bits which are not used for padding in the uplink TB; and the eNodeB determines that the reference quantity of bits for scheduling for next-time SRI scheduling of the UE is a larger value of the following two: the quantity of bits which are not used for padding in the uplink TB and the lower limit of the reference quantity of bits for scheduling.

To avoid that the reference quantity of bits for scheduling for next-time SRI scheduling is adjusted to be relatively small because an amount of the to-be-transmitted uplink data that one time of SRI scheduling of the UE requests to transmit is relatively small, in another embodiment of the present invention, if the uplink TB received in step 203 does not include a BSR or a BS level in a BSR is 0, the eNodeB obtains a quantity of bits which are not used for padding in the uplink TB; and if the quantity of bits which are not used for padding in the uplink TB is greater than a lowering protection threshold, the eNodeB determines that the reference quantity of bits for scheduling for next-time SRI scheduling of the UE is a larger value of the following two: the quantity of bits which are not used for padding in the uplink TB and the lower limit of the reference quantity of bits for scheduling.

To further adjust the lowering protection threshold adaptively, the method may further include the following steps.

Step 205: If a ratio of a quantity of padding bits in the uplink TB received in step 203 to a total quantity of bits in the uplink TB is greater than a ratio threshold, the eNodeB adds 1 to a lowering count within a current counting period.

The eNodeB performs SRI scheduling at least once within a counting period.

For first-time SRI scheduling of the UE, an initial value of the lowering count is 0.

Step 206: If the lowering count is greater than a count threshold, the eNodeB lowers a lowering protection threshold.

For example, the lowering protection threshold is 200 bits. If the ratio of the quantity of padding bits in the received uplink TB of the UE in response to SRI scheduling is greater than 20%, the eNodeB adds 1 to the quantity of the lowering count. If the quantity of the lowering count in a current counting period is greater than 5, that is, the eNodeB performs SRI scheduling at least five times in the current counting period, the eNodeB modifies the lowering protection threshold to 150 bits.

Same UE in an RRC connected state may transmit uplink data multiple times, that is, the UE may send an SRI to an eNodeB to request an uplink resource to send to-be-transmitted uplink data. Correspondingly, the eNodeB may perform SRI scheduling on the same UE multiple times. Each time after receiving the scheduling request indicator SRI sent by the user equipment, the eNodeB may perform steps 202 to 204 or 202 to 206.

For a small data packet service, if a size of most of the to-be-transmitted uplink data, for example, to-be-transmitted uplink data of a VoIP user, falls within an upper limit of a reference quantity of bits for scheduling and a periodic packet length does not change greatly, by means of the method provided in this embodiment of the present invention, the eNodeB may adaptively adjust the reference quantity of bits for scheduling according to a size of the to-be-transmitted uplink data of current-time SRI scheduling, and use an adjusted reference quantity of bits for scheduling to allocate an initial uplink resource for next-time SRI scheduling.

When the size of the to-be-transmitted uplink data increases, a reference quantity of bits for scheduling on which adjustment of at least one time of SRI scheduling is performed is greater than or equal to a size of the to-be-transmitted uplink data during next-time SRI scheduling, so that the eNodeB may allocate a PRB resource according to the reference quantity of bits for scheduling during next-time SRI scheduling, and the allocated PRB resource can be used to transmit all the to-be-transmitted uplink data of next-time SRI scheduling at one time. When the size of the to-be-transmitted uplink data decreases, the reference quantity of bits for scheduling can decrease accordingly, so that PRB resources are prevented from being wasted.

Therefore, by means of the method provided in this embodiment of the present invention, utilization of PRB resources of a cell can be ensured, the PRB resources of the cell can be properly allocated, and a data transmission time of an uplink small data packet service of UE can be effectively reduced.

Figure 3:
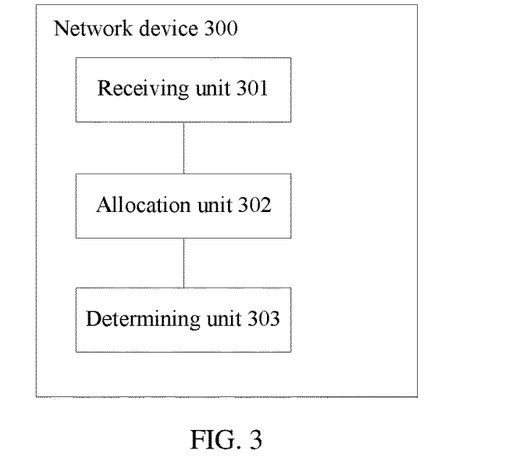
FIG. 3 is a structural diagram of a network device according to another embodiment of the present invention.

FIG. 3 is a structural diagram of a network device according to another embodiment of the present invention. The network device provided in this embodiment of the present invention may implement the foregoing method embodiment of the present invention. As shown in the figure, the network device 300 may include: a receiving unit 301, an allocation unit 302, and a determining unit 303.

The receiving unit 301 is configured to receive a scheduling request indicator SRI sent by user equipment UE, where the SRI is used for the UE to send a request to the network device, to request transmission of to-be-transmitted uplink data.

The allocation unit 302 is configured to allocate M PRBs to the UE according to a reference quantity of bits for scheduling, where the M PRBs are used to transmit the to-be-transmitted uplink data of the UE, M is an integer greater than or equal to zero, the reference quantity of bits for scheduling is set by the determining unit 303, and the reference quantity of bits for scheduling is less than or equal to a total quantity of bits that can be transmitted by using the M PRBs.

The receiving unit 301 is further configured to receive, on a physical uplink shared channel PUSCH, an uplink transmission block TB sent by the UE by using at least one PRB of the M PRBs.

The receiving unit 301 may receive, on the PUSCH, the uplink TB that is sent, in response to current-time SRI scheduling, by the UE by using the at least one PRB of the M PRBs.

The determining unit 303 is configured to determine, according to the uplink TB received by the receiving unit 301, a reference quantity of bits for scheduling for next-time SRI scheduling of the UE.

The reference quantity of bits for scheduling for next-time SRI scheduling of the UE is less than or equal to an upper limit of the reference quantity of bits for scheduling. Besides, the reference quantity of bits for scheduling for next-time SRI scheduling of the UE is greater than or equal to a lower limit of the reference quantity of bits for scheduling. The upper limit of the reference quantity of bits for scheduling is used to prevent most PRBs from being occupied by SRI scheduling of UE, so as to maintain fairness for other users. The lower limit of the reference quantity of bits for scheduling is used to prevent the reference quantity of bits for scheduling from being adjusted to be excessively low.

In an embodiment of the present invention, the determining unit 303 being configured to determine, according to the uplink TB received by the receiving unit 301, a reference quantity of bits for scheduling for next-time SRI scheduling includes: when the uplink TB received by the receiving unit 301 includes a BSR and a BS level in the BSR is greater than 0, determining that the reference quantity of bits for scheduling for next-time SRI scheduling of the UE is a smaller value of the following two: the upper limit of the reference quantity of bits for scheduling and a sum of the reference quantity of bits for scheduling for current-time SRI scheduling and an upper limit of a bit quantity range corresponding to the BS level.

In another embodiment of the present invention, the determining unit 303 being configured to determine, according to the uplink TB received by the receiving unit 301, a reference quantity of bits for scheduling for next-time SRI scheduling of the UE includes: if the uplink TB received by the receiving unit 301 does not include a BSR or a BS level in a BSR is 0, obtaining a quantity of bits which are not used for padding in the uplink TB received by the receiving unit 301; and determining that the reference quantity of bits for scheduling for next-time SRI scheduling of the UE is a larger value of the following two: the quantity of bits which are not used for padding in the uplink TB and the lower limit of the reference quantity of bits for scheduling.

In another embodiment of the present invention, the determining unit 303 being configured to determine, according to the uplink TB received by the receiving unit 301, a reference quantity of bits for scheduling for next-time SRI scheduling of the UE includes: if the uplink TB received by the receiving unit 301 does not include a BSR or a BS level in a BSR is 0, obtaining a quantity of bits which are not used for padding in the uplink TB received by the receiving unit 301; and if the quantity of bits which are not used for padding in the uplink TB is greater than a lowering protection threshold, determining that the reference quantity of bits for scheduling for next-time SRI scheduling of the UE is a larger value of the following two: the quantity of bits which are not used for padding in the uplink TB and the lower limit of the reference quantity of bits for scheduling.

Same UE in an RRC connected state may transmit uplink data multiple times, that is, the UE may send an SRI to the network device multiple times to request an uplink resource to transmit to-be-transmitted uplink data. Correspondingly, the network device may perform SRI scheduling on the same UE multiple times. For a small data packet service, if a size of most of the to-be-transmitted uplink data falls within an upper limit of a reference quantity of bits for scheduling and a periodic packet length does not change greatly, by means of the network device provided in this embodiment of the present invention, the reference quantity of bits for scheduling may be adaptively adjusted according to a size of the to-be-transmitted uplink data of current-time SRI scheduling, and an adjusted reference quantity of bits for scheduling may be used to allocate an initial uplink resource of next-time SRI scheduling.

When the size of the to-be-transmitted uplink data increases, a reference quantity of bits for scheduling on which adjustment of at least one time of SRI scheduling is performed may be greater than or equal to a size of the to-be-transmitted uplink data during next-time SRI scheduling, so that the network device may allocate a PRB resource according to the reference quantity of bits for scheduling during next-time SRI scheduling, and the allocated PRB resource can be used to transmit all the to-be-transmitted uplink data of next-time SRI scheduling at one time. When the size of the to-be-transmitted uplink data decreases, the reference quantity of bits for scheduling can decrease accordingly, and PRB resources are prevented from being avoided.

Therefore, by means of the network device provided in this embodiment of the present invention, utilization of PRB resources of a cell can be improved, the PRB resources of the cell can be properly allocated, and a data transmission time of an uplink small data packet service of UE can be effectively reduced.

Further, before performing first-time SRI scheduling on the same UE, the determining unit 303 may set the reference quantity of bits for scheduling to an initial value, where the initial value is, for example, a quantity of bits needed to send one BSR, or may be the lower limit of the reference quantity of bits for scheduling, but the present invention is not limited thereto.

Further, a network device provided in another embodiment of the present invention may further include: an adjustment unit 304, configured to adjust a lowering protection threshold according to a quantity of padding bits in the uplink TB received by the receiving unit 301. In an embodiment of the present invention, the adjustment unit 304 being configured to adjust a lowering protection threshold according to a quantity of padding bits in the uplink TB received by the receiving unit 301 includes: when it is determined that a ratio of the quantity of padding bits in the uplink TB received by the receiving unit 301 to a total quantity of bits in the uplink TB is greater than a ratio threshold, adding 1 to a lowering count within a counting period; and if the lowering count within the counting period is greater than a count threshold, lowering the lowering protection threshold.

The network device 300 performs at least one time of SRI scheduling within a counting period.

By means of the network device in this embodiment, that the reference quantity of bits for scheduling for next-time SRI scheduling cannot be lowered in time because the lowering protection threshold is set to be excessively large, resulting in that a relatively large quantity of PRB resources are wasted when next-time SRI scheduling is performed according to the reference quantity of bits for scheduling can be avoided.

It should be noted that in this embodiment of the present invention, the receiving unit may be implemented by using a receiver, and the allocation unit, the determining unit, and the adjustment unit may be implemented by using one or more processors.

Figure 4:
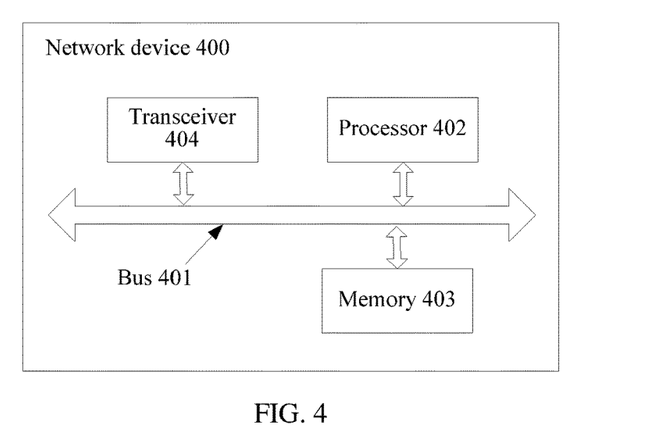
FIG. 4 is a structural diagram of a network device according to another embodiment of the present invention.

It should be noted that for an interaction procedure between the foregoing units, reference may be specifically made to description in the method embodiments, and details are not described herein again. FIG. 4 is a structural diagram of a network device according to another embodiment of the present invention. As shown in FIG. 4, the network device 400 in this embodiment includes: a bus 401, a processor 402 connected to the bus 401, a memory 403 connected to the bus 401, and a transceiver 404 connected to the bus 401. The memory 403 stores a set of program code, and the memory 403 may include a non-volatile Memory. The processor 402 may be a central processing unit (CPU), or an application specific integrated circuit (ASIC), or may be configured into one or more integrated circuits for implementing the embodiments of the present invention. The processor 402 invokes a program stored in the memory 403 by using the bus 401, so that the processor 402 is configured to: control the transceiver 404 to receive a scheduling request indicator SRI sent by user equipment UE, where the SRI is used for the UE to send a request to the network device, to request transmission of to-be-transmitted uplink data; allocate M PRBs to the UE according to a reference quantity of bits for scheduling, where the M PRBs are used to transmit the to-be-transmitted uplink data of the UE, M is an integer greater than or equal to zero, the reference quantity of bits for scheduling is set by the processor 402, and the reference quantity of bits for scheduling is less than or equal to a total quantity of bits that can be transmitted by using the M PRBs; control the transceiver 404 to receive, on a physical uplink channel PUSCH, an uplink transmission block TB that is sent, in response to SRI scheduling, by the UE by using at least one PRB of the M PRBs; and determine, according to the uplink TB received by the transceiver 404, a reference quantity of bits for scheduling for next-time SRI scheduling of the UE.

In an embodiment of the present invention, the processor 402 is configured to: if the uplink TB received by the transceiver 404 includes a BSR and a BS level in the BSR is greater than 0, determine that the reference quantity of bits for scheduling for next-time SRI scheduling of the UE is a smaller value of the following two: the upper limit of the reference quantity of bits for scheduling and a sum of the reference quantity of bits for scheduling for current-time SRI scheduling and an upper limit of a bit quantity range corresponding to the BS level.

In another embodiment of the present invention, the processor 402 is configured to: if the uplink TB received by the transceiver 404 does not include a BSR or a BS level in a BSR is 0, obtain a quantity of bits which are not used for padding in the uplink TB; and determine that the reference quantity of bits for scheduling for next-time SRI scheduling of the UE is a larger value of the following two: the quantity of bits which are not used for padding in the uplink TB and the lower limit of the reference quantity of bits for scheduling.

In another embodiment of the present invention, the processor 402 is configured to: if the uplink TB received by the transceiver 404 does not include a BSR or a BS level in a BSR is 0, obtain a quantity of bits which are not used for padding in the uplink TB; and if the quantity of bits which are not used for padding in the uplink TB is greater than a lowering protection threshold, determine that the reference quantity of bits for scheduling for next-time SRI scheduling of the UE is a larger value of the following two: the quantity of bits which are not used for padding in the uplink TB and the lower limit of the reference quantity of bits for scheduling.

Further, before performing first-time SRI scheduling on same UE, the processor 402 may set the reference quantity of bits for scheduling to an initial value, where the initial value is, for example, a quantity of bits needed to send one BSR, or the lower limit of the reference quantity of bits for scheduling, but the present invention is not limited thereto.

Further, to adjust the lowering protection threshold in time, the processor 402 is further configured to perform the following operation: adjusting a lowering protection threshold according to a quantity of padding bits in the uplink TB received by the transceiver 404.

In an embodiment of the present invention, the processor 402 is configured to: when it is determined that a ratio of the quantity of padding bits in the uplink TB received by the transceiver 404 to a total quantity of bits in the uplink TB is greater than a ratio threshold, add 1 to a lowering count within a counting period; and if the lowering count is greater than a count threshold, lower the lowering protection threshold, for example, decrease a value of the lowering protection threshold by a corresponding quantity of bits. The network device performs at least one time of SRI scheduling within a counting period.

It should be noted that for a technical solution specifically implemented by the processor 402 by invoking the program code stored in the memory 403, reference may be made to the foregoing method embodiment, and implementation principles and technical effects of the technical solution are similar to those in the method embodiments. Reference may be made to related records in the foregoing embodiments, and details are not described herein again.

Figure 5:
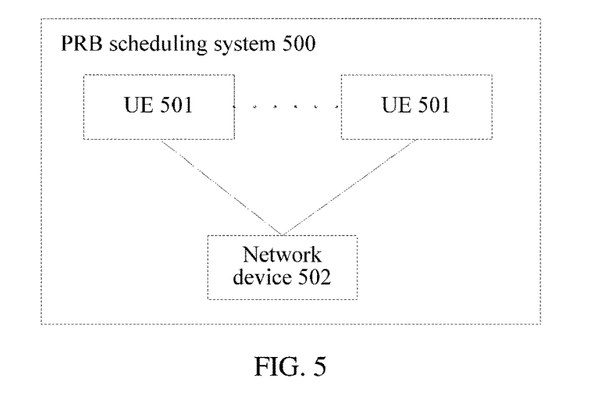
FIG. 5 is a schematic networking diagram of a PRB scheduling system according to another embodiment of the present invention.

FIG. 5 is a schematic networking diagram of a PRB scheduling system according to another embodiment of the present invention. As shown in FIG. 5, the system includes at least one user equipment UE 501 and a network device 502.

The network device 502 may be the network device 300 shown in FIG. 3 or the network device 400 shown in FIG. 4. Because description is already provided in the embodiments shown in FIG. 3 and FIG. 4, implementation principles and technical effects of the network device 502 are similar to those of the network device 300 and the network device 400, reference may be made to related description in the foregoing embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed.

In addition, functional units in the embodiments of the present invention may be integrated into one processing unit, or each of the units may exist alone physically, or two or more units are integrated into one unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium.

The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the embodiments of the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method, comprising:
   receiving, by a network device, a scheduling request indicator (SRI) sent by user equipment (UE), wherein the SRI is used for the UE to request transmission of to-be-transmitted uplink data;
   allocating, by the network device, M physical resource blocks (PRBs) to the UE according to a reference quantity of bits for scheduling, wherein M is an integer greater than or equal to zero, the reference quantity of bits for scheduling is set by the network device, and the reference quantity of bits for scheduling is less than or equal to a total quantity of bits that can be transmitted by using the M PRBs;
   receiving, by the network device, on a physical uplink shared channel (PUSCH), an uplink transmission block (TB) that is sent, in response to SRI scheduling, by the UE using at least one PRB of the M PRBs; and
   determining, by the network device according to the uplink TB, a reference quantity of bits for scheduling for next-time SRI scheduling of the UE.

2. The method according to claim 1, wherein determining, by the network device according to the uplink TB, the reference quantity of bits for scheduling for next-time SRI scheduling of the UE comprises:
   when the uplink TB does not comprise a buffer status report (BSR), or the uplink TB comprises a BSR and a buffer size (BS) level in the BSR equals 0, obtaining, by the network device, a quantity of traffic bits in the uplink TB; and when the quantity of bits which are not used for padding in the uplink TB is greater than a lowering protection threshold, determining, by the network device, that the reference quantity of bits for scheduling for next-time SRI scheduling of the UE is a larger value of the following two: the quantity of bits which are not used for padding in the uplink TB and a lower limit of the reference quantity of bits for scheduling.

3. The method according to claim 2, further comprising:
adjusting, by the network device, the lowering protection threshold according to a quantity of padding bits in the uplink TB.

4. The method according to claim 3, wherein adjusting the lowering protection threshold according to the quantity of padding bits in the uplink TB comprises:
when it is determined that a ratio of the quantity of padding bits in the uplink TB to a total quantity of bits in the uplink TB is greater than a ratio threshold, adding, by the network device, 1 to a lowering count within a counting period; and
when the lowering count within the counting period exceeds a count threshold, lowering, by the network device, the lowering protection threshold.

5. The method according to claim 1, wherein determining the reference quantity of bits for scheduling for next-time SRI scheduling of the UE comprises:
when the uplink TB comprises a buffer status report (BSR), and a buffer size (BS) level in the BSR is greater than 0, determining, by the network device, that the reference quantity of bits for scheduling for next-time SRI scheduling is a smaller value of the following two: an upper limit of the reference quantity of bits for scheduling and a sum of the reference quantity of bits for scheduling and an upper limit of a bit quantity range corresponding to the BS level.

6. The method according to claim 1, wherein before performing the method, the network device sets the reference quantity of bits for scheduling as the lower limit of the reference quantity of bits for scheduling.

7. The method according to claim 1, wherein the UE is UE of a Voice over Internet Protocol (VoIP) type.

8. The method according to claim 1, wherein the network device is an evolved Node B (eNodeB).

9. A network device, comprising:
a receiver;
a processor; and
a computer-readable storage medium storing a program to be executed by the processor, the program including instructions for:
controlling the receiver to receive a scheduling request indicator (SRI) sent by user equipment (UE), wherein the SRI is used for the UE to send a request to the network device, to request transmission of to-be-transmitted uplink data;
allocating M physical resource blocks (PRBs) to the UE according to a reference quantity of bits for scheduling, wherein the M PRBs are used to transmit the to-be-transmitted uplink data of the UE, in M is an integer greater than or equal to zero, and the reference quantity of bits for scheduling is less than or equal to a total quantity of bits that can be transmitted using the M PRBs;
controlling the receiver to receive on a physical uplink shared channel (PUSCH), an uplink transmission block (TB) that is sent, in response to SRI scheduling, by the UE using at least one PRB of the M PRBs; and
determining, according to the uplink TB received by the receiver, a reference quantity of bits for scheduling for next-time SRI scheduling of the UE.

10. The network device according to claim 9, wherein the program further includes instructions for:
when the uplink TB does not comprise a buffer status report (BSR), or the uplink TB comprises a BSR and a buffer size (BS) level in the BSR equals 0, obtaining a quantity of bits which are not used for padding in the uplink TB; and
when the quantity of bits which are not used for padding in the uplink TB is greater than a lowering protection threshold, determining that the reference quantity of bits for scheduling for next-time SRI scheduling of the UE is a larger value of the following two: the quantity of bits which are not used for padding in the uplink TB and a lower limit of the reference quantity of bits for scheduling.

11. The network device according to claim 10, wherein the program further includes instructions for:
adjusting the lowering protection threshold according to a quantity of padding bits in the uplink TB.

12. The network device according to claim 11, wherein the program further includes instructions for:
when it is determined that a ratio of the quantity of padding bits in the uplink TB to a total quantity of bits in the uplink TB is greater than a ratio threshold, adding 1 to a lowering count within a counting period; and
when the lowering count within the counting period exceeds a count threshold, lowering the lowering protection threshold.

13. The network device according to claim 9, wherein the program further includes instructions for:
when the uplink TB comprises a buffer status report (BSR), and a buffer size (BS) level in the BSR is greater than 0, determining that the reference quantity of bits for scheduling for next-time SRI scheduling is a smaller value of the following two: an upper limit of the reference quantity of bits for scheduling and a sum of the reference quantity of bits for scheduling and an upper limit of a bit quantity range corresponding to the BS level.

14. The network device according to claim 9, wherein the program further includes instructions for:
setting an initial value of the reference quantity of bits for scheduling as the lower limit of the reference quantity of bits for scheduling.

15. The network device according to claim 9, wherein the UE is UE of a Voice over Internet Protocol (VoIP) type.

16. The network device according to claim 9, wherein the network device is an evolved Node B (eNodeB).

17. A physical resource block (PRB) scheduling system, wherein the system comprises:
a user equipment (UE); and
a network device, comprising:
a receiver;
a processor; and
a computer-readable storage medium storing a program to be executed by the processor, the program including instructions for:
controlling the receiver to receive a scheduling request indicator (SRI) sent by user equipment (UE), wherein the SRI is used for the UE to send a request to the network device, to request transmission of to-be-transmitted uplink data; and
allocating M physical resource blocks (PRBs) to the UE according to a reference quantity of bits for scheduling, wherein the M PRBs are used to transmit the to-be-transmitted uplink data of the UE, in M is an integer greater than or equal to zero, the reference quantity of bits for scheduling is set by a determining unit, and the reference quantity of bits for scheduling is less than or equal to a total quantity of bits that can be transmitted by using the M PRBs; and controlling the receiver to receive on a physical uplink shared channel (PUSCH), an uplink transmission block (TB) that is sent, in response to SRI scheduling, by the UE by using at least one PRB of the M PRBs; and determining, according to the uplink TB received by the receiver, a reference quantity of bits for scheduling for next-time SRI scheduling of the UE.

* * * * *